Inventor:
HERBERT G. R. BENNETT,
by Usina & Rauber
his Attorneys.

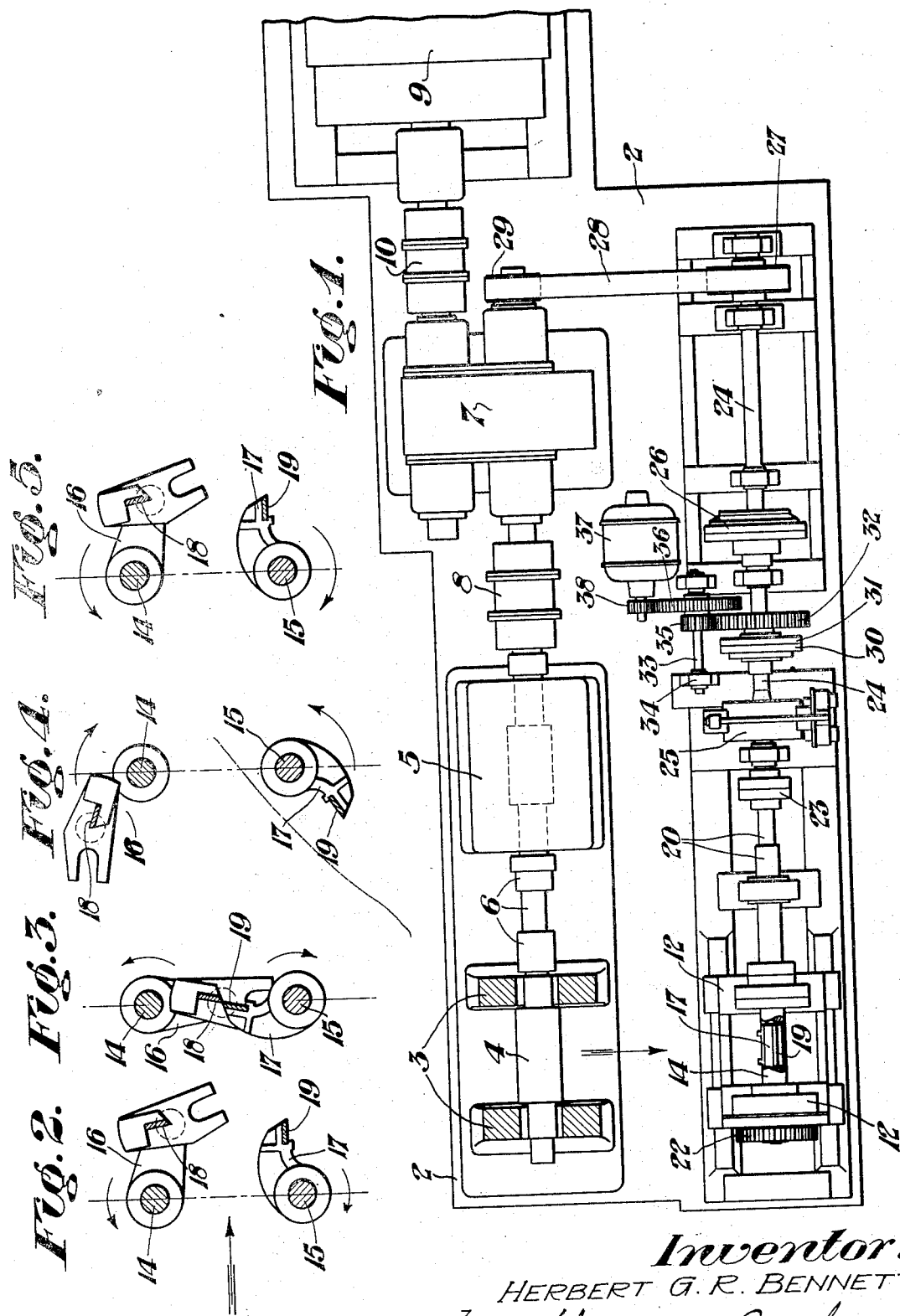

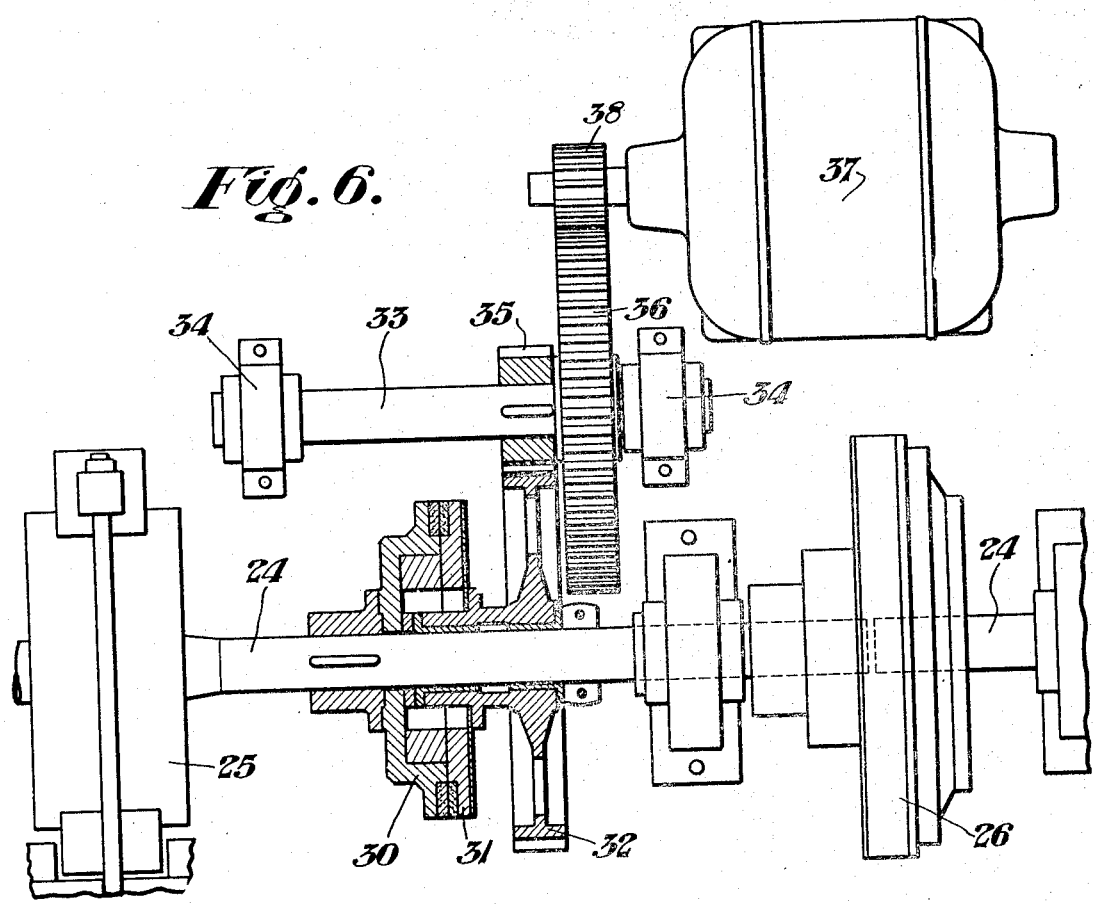
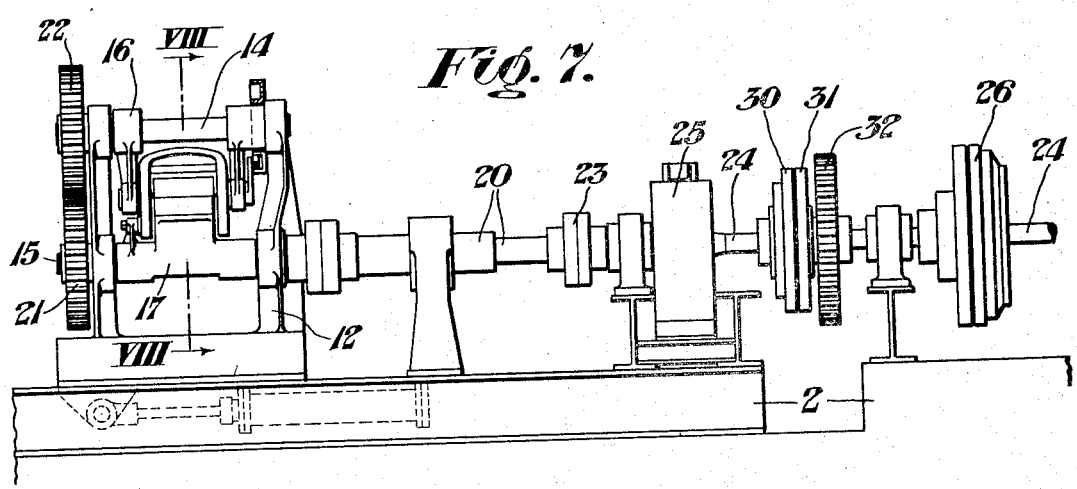

Patented June 18, 1935

2,005,127

UNITED STATES PATENT OFFICE 2,005,127

METAL PROCESSING MACHINE

Herbert G. R. Bennett, Duquesne, Pa.

Application December 29, 1933, Serial No. 704,573

3 Claims. (Cl. 164—66)

This invention relates to metal processing machines and particularly to rotary shears for use in shearing the ends of bars passing through a continuous mill or the like. Such shears are usually operative to crop or sever the cold ends of the bars while the latter are moving.

A shear of the type described is disclosed in Patent No. 1,853,434 to Kling, April 12, 1932, and provides a construction in which the cutting knives are mounted in substantial alinement during the shearing cycle and in which provision is made to guide the movable knife holder during its rotary movement so that it will register with the cooperating element of the other knife member when they are brought into cutting position.

A device of this sort is highly efficient in operation, but considerable difficulty is experienced in preventing the knives from overtraveling their initial position, with the result that when making the next cycle there is not sufficient acceleration thereof to function without deforming or distorting the end of the bar. If the shear is located between two stands of a continuous mill, the deformed or distorted end of the bar causes considerable delay by not entering the next pass.

One object of the present invention is the provision of a novel metal processing machine, such as a rotary shear, having a driving means which will positively and automatically return the processing elements, or shear knives, to their initial positions after their cycle of operation, resulting in a clean processing, or shearing operation, without any of the difficulties referred to.

Another object is to provide a novel apparatus for backing-up the drive of a rotary type of shear, or like construction, which may be economically and simply installed on existing types of equipment.

These and further objects will be apparent after referring to the drawings, in which:

Figure 1 is a plan of a rolling mill with a shear of the general type of the prior patent referred to disposed on its delivery side, together with operating devices for the same.

Figures 2, 3, 4 and 5 are elevations of the shear knives in various stages of operation.

Figure 6 is a fragmentary plan of part of the driving devices for the rotary shear, and showing the novel apparatus of the invention, part of which is illustrated in section.

Figure 7 is an end elevation of the shear of the class described, together with part of its driving means and several of the elements of the present invention as applied thereto.

Figure 8:
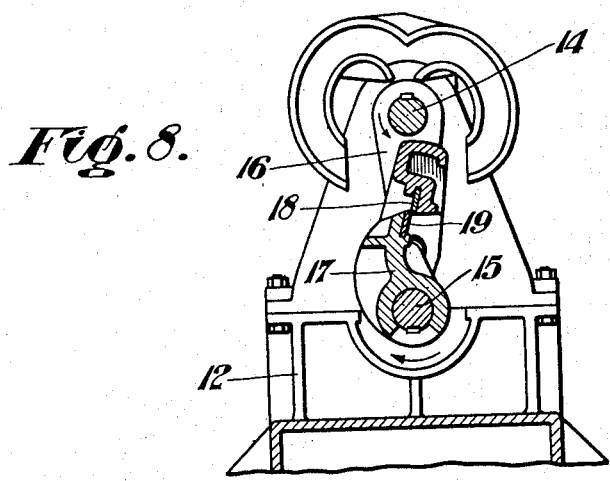
Figure 8 is a sectional end elevation of the shear per se.

Referring more particularly to the drawings, the numeral 2 designates a bed upon which there is adapted to rest a mill housing 3. The mill housing 3 supports a plurality of rolls 4, which may be any of a number of well known types, and which are driven from a pinion box 5 through a coupling 6. A gear reduction transmission unit 7 is mounted on the other side of the pinion box 6 and provided with a coupling member 8, for driving the mill.

A suitable motor 9 is secured to the bed 2 adjacent the gear reduction transmission unit 7 and adapted to drive the latter through a coupling 10.

A housing 12 is positioned on the bed 2 in substantial alinement with the mill housing 3 and serves to support upper and lower shafts 14 and 15, respectively. A shear arm or lever 16 is secured to the upper shaft 14, and a similar shear arm 17 is secured to the lower shaft 15, each being provided with a knife as at 18 and 19, respectively. A shaft 20 is suitably supported on the bed 2 and connected to the lower shaft 15 of the gear housing. A gear 21 is secured to one end of the shaft 15 and serves to give rotation to a similar gear 22 which is connected to the upper shaft 14. The other end of the shaft 20 is provided with a coupling member 23 to which there is secured a shaft 24 having operatively associated therewith a magnetic brake 25. A magnetic clutch 26 is likewise operatively connected to the shaft 24, as is a gear 27 which is adapted to be driven through a link belt 28 by means of a gear 29, the latter being secured to the driven shaft of the gear reduction transmission unit 7.

The motor 9 is operated in such manner as to give motion to the gear reduction transmission unit 7, the pinions in the pinion box 5, and the rolls 4 of the mill housing 3. The gear 29 is rotated by the driven element of the gear reduction transmission unit 7 and causes the shaft 24 to rotate through the link belt 28 and gear 27. The magnetic brake 25 and magnetic clutch 26 serve to periodically rotate the shaft 24 which, through the coupling 23, causes the shaft 20 to operate the shearing elements or knives 18 and 19 of the shear housing 12. As previously pointed out, these devices frequently overrun their initial positions and assume stages of operation which are in advance of their true positions and, when automatically actuated, cut the bar or work-piece in such manner as to deform or distort the end thereof.

According to the present invention, the shaft 24 is provided with a driven element 30 and a driving element 31 forming a part of a second magnetic clutch, while the latter further carries a gear 32.

A shaft 33 is suitably journaled on the bed 2 parallel with and closely adjacent the shaft 24, as shown at 34, and provided with a pinion 35. A gear 36 is likewise secured to the shaft 33 and is suitably driven by a motor 37 having a pinion 38 in constant mesh therewith.

Figure 9:
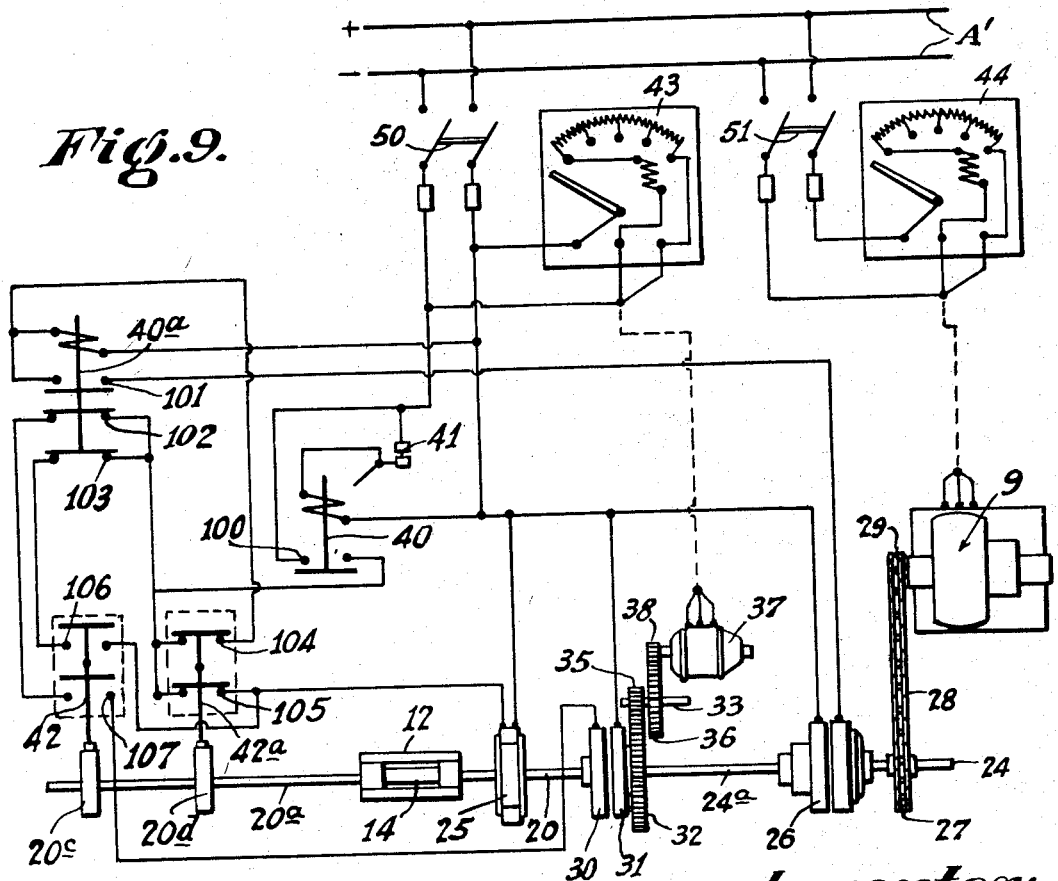
Figure 9 is a diagrammatic representation of a wiring circuit which may be used for actuating the apparatus of the invention.

In Figure 9 of the drawings, there is illustrated a diagram according to which the apparatus of the invention may be operated. The various electrical elements included in this diagram are conventional in all respects and form no part of the present invention other than as means for operating the mechanical elements, it being understood that substitutions may be made therefor. However, according to Figure 9, the shaft 20 which drives the lower shaft 15 of the shear is extended from the opposite side thereof, as shown at 20ª. A pair of cams 20ᶜ and 20ᵈ are secured to the extended end 20ª of the shaft 20, the former serving to operate a starting limit-switch 42 and the latter a cut-out limit-switch 42ª. An adjustable timer (or time relay) 40 is provided for delaying the rotation of the shear knives 18 and 19 for a suitable and predetermined interval of time.

An auxiliary or secondary timer (or time relay) 40ª is associated with the timer 40 to operate in a manner to be later described. The timer 40 is operated by a flag-switch 41 which is disposed in a position to be contacted by the bar, or material being processed or sheared, and in advance of the shear housing 12.

A manually operable starting rheostat 43 is connected, by a switch 50, between power lines A' and the continuously running motor 37 for initiating the operation of the latter. A manually operable starting rheostat 44 is connected, by a switch 51, between the power lines and the main drive motor 9 for initiating its operation, which is also continuous. The switches 50 and 51 being open, all of the elements are deenergized.

According to the diagram illustrated, an operating cycle of the various elements is as follows:

The switches 50 and 51 are closed, and the starting rheostats 43 and 44 are manually operated to bring the motors 37 and 9 up to continuous running speed.

The leading end of the bar, or work-piece, emerging from the rolls 4 contacts the flag-switch 41 and closes its contacts, which energizes the coil of the adjustable timer 40. After a suitable interval of time has elapsed, depending upon the speed of the rolls 4 (and for which the timer is adjusted) the contacts 100 are closed. The closing of these contacts energizes the magnetic brake 25 through the closed contacts 104 of the cut-out limit-switch 42ª; thus causing the brake to release. The closing of the contacts 100 of the timer 40 also energizes the coil of the auxiliary timer 40ª, through the closed contacts 105 of the cut-out limit switch 42ª.

The contacts 102 and 103 of the auxiliary timer 40ª are thus immediately opened to prevent other elements from interfering with the cycle during the cutting operation.

At the time the closed contacts 102 and 103 of the auxiliary timer 40ª are opened, the open contact 101 is closed; thus energizing the magnetic clutch 26 through the closed contact 105 of the cut-out limit switch 42ª. The energization of the magnetic clutch 26 causes it to engage; thus the motor 9, which has been continuously rotating the shaft 24, through the chain 28, is caused to rotate the shaft 24ª. The shaft 20 is driven through the shaft 24ª to rotate the shafts 14 and 15 upon which the shear knives 18 and 19 are mounted. The movement of the knives is through approximately seven-eighths of a revolution; or in other words, from the "at-rest" position to just beyond the "cut" position. At this last position, the cam 20ᵈ, on the extension 20ª of the shaft 20, causes the opening of the contacts 104 and 105 of the cut-out limit-switch 42ª. The opening of the contact 105 deenergizes the coil of the auxiliary timer 40ª, which immediately opens the contact 101. The deenergization of the magnetic clutch 26 is caused by the opening of the contact 101; thus disconnecting the shaft 24ª from the shaft 24 and the motor 9.

The opening of the contact 104 of the cut-out limit-switch 42ª also deenergizes the magnetic brake 25, causing it to stop the rotation of the now disconnected shaft 24ª. This action brings the shear shafts 14 and 15 to rest.

Shortly after the cut-out limit switch 42ª operates to stop the shear, the cam 20ᶜ on the extension 20ª of the shaft 20 allows contacts 106 and 107 of the starting limit-switch 42 to close. Nothing is caused to happen by this closing of the contacts 106 and 107, due to the fact that contacts 102 and 103 of the auxiliary timer 40ª remain open over a sufficient interval of time (which is adjustable) after its coil is deenergized by the opening of contact 105 of the cut-out limit-switch 42ª. This deenergizes the magnetic clutch 26 and the brake 25, bringing the shaft 24 and shear shafts 14 and 15 to rest, as previously mentioned. The contact 102 of the auxiliary timer 40ª now closes, and the brake 25 is energized through the closed contact 106 of the starting limit-switch 42, causing the release of the shaft 20. At the same time, contact 103 of the auxiliary timer 40ª also opens and energizes the clutch 30—31 through the closed contact 107 of the starting limit-switch 42.

During all this time the driving element 31 of the magnetic clutch 30—31 has been continuously rotated about the shaft 24ª, by motor 37, due to the fact that it rides on a sleeve. The driven element 30 of the clutch 30—31, however, is keyed directly to the shaft 24ª and rotates therewith. When the clutch 30—31 is energized, the rotation of the motor 37 causes the shaft 24ª and shear shafts 14 and 15 to move in the reverse direction from the cutting movement of the shear knives 18 and 19 through approximately three-eighths of a revolution. At this point the cam 20ᶜ causes contacts 106 and 107 of the starting limit-switch 42 to open. The opening of contact 107 deenergizes the magnetic clutch 30—31, causing it to release; thus disconnecting the motor 37 from the shaft 24ª. The opening of contact 106 of the starting limit-switch 42 deenergizes the brake 25, causing it to stop the rotation of the shaft 24ª. This stops the shear knives 18 and 19 in the starting position. At about this time, the rear end of the bar passes under the flag-switch 41, causing its contacts to open, thus deenergizing the adjustable timer 40 and opening its contact 100. The various elements are now ready for another cycle of operation as the following bar strikes the flag-switch 41.

As previously mentioned, the diagram of Figure 9, together with the various electrical elements associated therewith, is entirely conventional in all respects and forms no part of the present invention other than as means for operating the mechanical elements thereof, and it will be readily apparent to those skilled in the art that numerous changes may be made therein which may or may not render it entirely automatic.

While I have shown and described one specific embodiment of my invention, it will be understood that I do not wish to be limited exactly thereto, since various modifications may be made without departing from the scope of my invention, as defined in the following claims.

I claim:

1. A metal processing machine, a shaft for driving said machine, a magnetic clutch interposed in said shaft, a magnetic brake on said shaft, a second magnetic clutch on said shaft, means for driving said shaft, extraneous means for imparting rotation to said second magnetic clutch, and means for controlling the operation of all of said devices.

2. A metal processing machine, a shaft for driving said machine, a magnetic clutch on said shaft, a magnetic brake on said shaft, a second magnetic clutch on said shaft comprising a driven element secured thereto, a gear loosely mounted on said shaft and carrying the driving member of said magnetic clutch, means for driving said shaft, and means for rotating said gear in such manner as to restore said metal processing machine to a determined position in its operating cycle.

3. A metal processing machine, driving means for said machine, a magnetic clutch operatively associated with said driving means, a magnetic brake for said driving means, a second magnetic clutch operatively associated with said driving means, a flag switch disposed in the path of the work-piece to be processed for initiating the operation of said driving means, a limit switch for discontinuing the operation of said driving means and to initiate the operation of said second magnetic clutch, and means operatively associated with said last named magnetic clutch for restoring said metal processing machine to a determined position in its operating cycle.

HERBERT G. R. BENNETT.